Feb. 2, 1943. W. F. ZALEWSKI ET AL 2,309,726
TRIMMING MECHANISM
Filed March 28, 1939 3 Sheets-Sheet 1
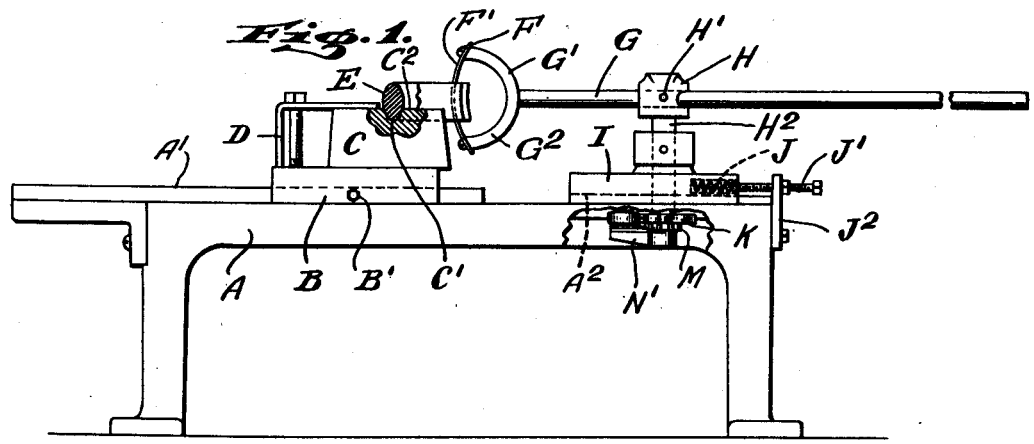
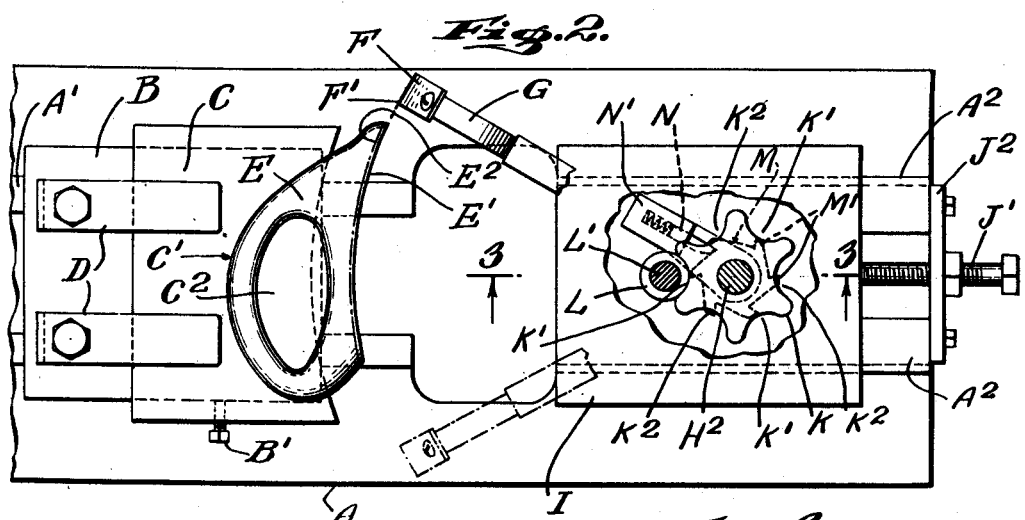
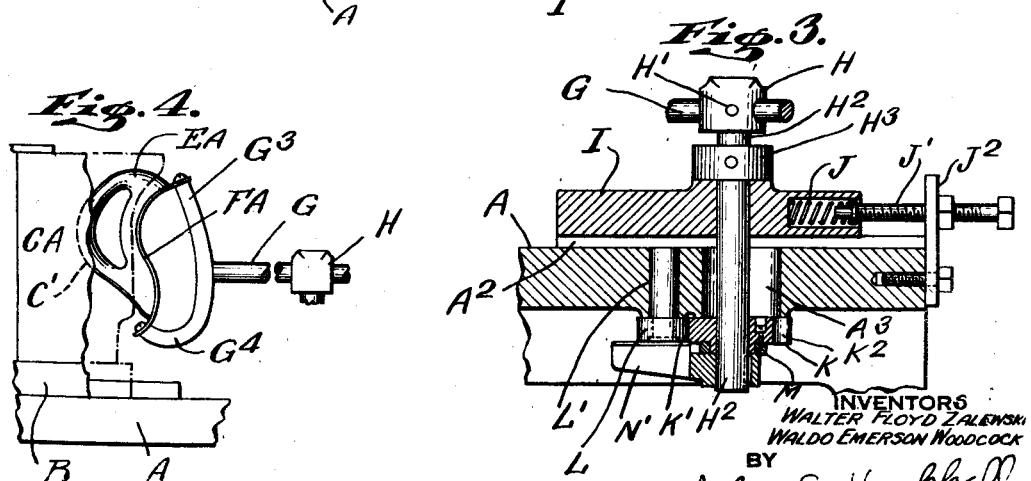
INVENTORS
WALTER FLOYD ZALEWSKI
WALDO EMERSON WOODCOCK
BY
John E. Hubbell
ATTORNEY INVENTORS
WALTER FLOYD ZALEWSKI
WALDO EMERSON WOODCOCK
BY
John E. Hubbell
ATTORNEY

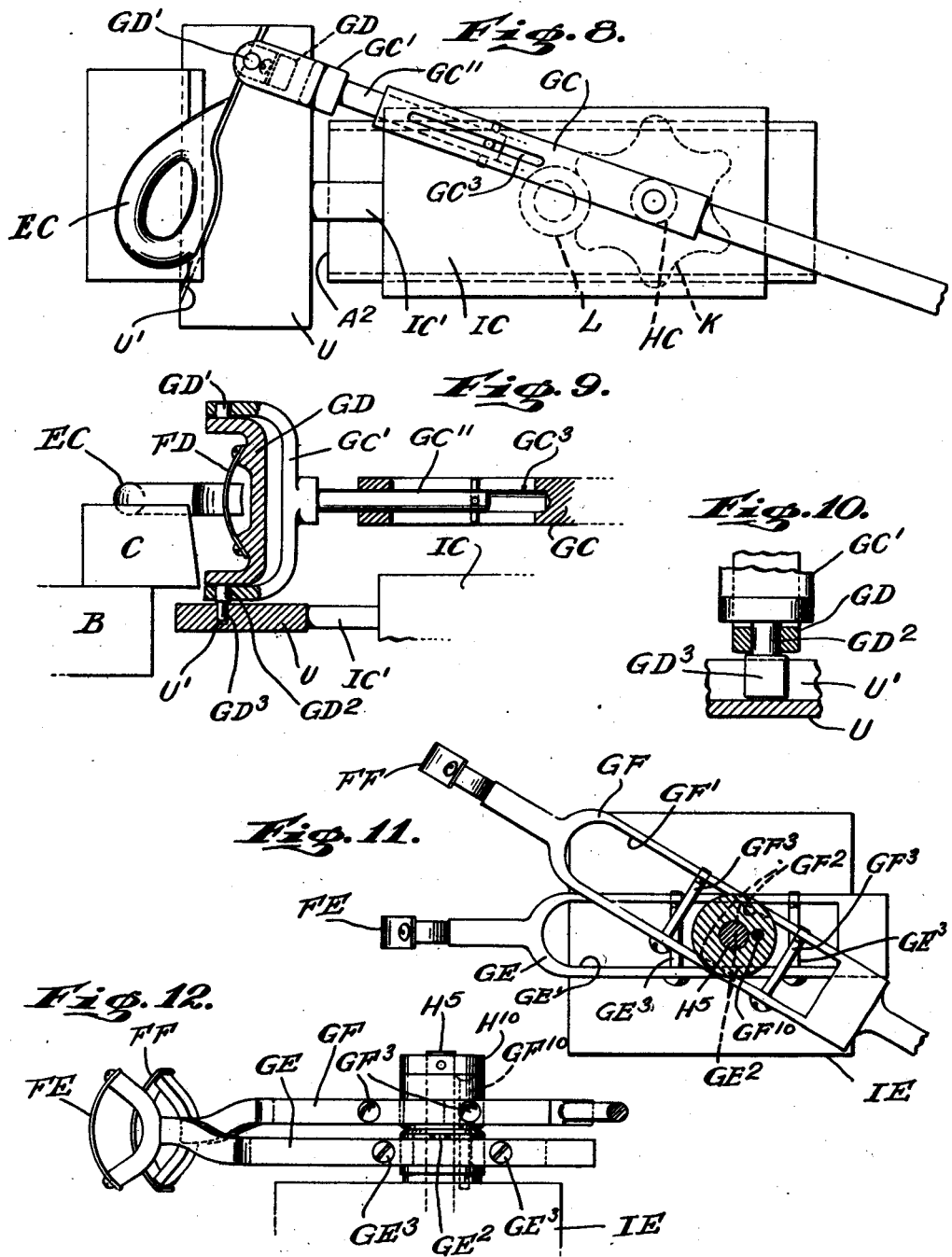

Patented Feb. 2, 1943

2,309,726

UNITED STATES PATENT OFFICE 2,309,726

TRIMMING MECHANISM

Walter Floyd Zalewski and Waldo Emerson Woodcock, Syracuse, N. Y., assignors to Onondaga Pottery Company, Syracuse, N. Y., a corporation of New York Application March 28, 1939, Serial No. 264,668

8 Claims. (Cl. 25—105)

The general object of the present invention is to provide simple and effective mechanism for trimming or cutting away surplus material from a body or part of ceramic material in a plastic condition. The invention was primarily devised and is especially useful in the production of tea and coffee cup handle parts each subjected to a final shaping operation by said mechanism and thereby given a smooth, suitably shaped surface adapted to fit against and adhere to the body of a cup in which the handle is to be incorporated.

It has long been the standard practice in the manufacture of ordinary tea and coffee cups, to initially form the cup handle parts by casting them in a mold having water absorbing walls and shaped to form a plurality of handle parts, connected to a common runner or sprue, the sprue connection to each handle part being at the cup side of the handle. After each such individual handle part is broken away from the sprue, it is trimmed, or cut away, to complete its shaping and to provide it with a surface suitably smooth and properly shaped to fit against and adhere to the corresponding cup body when pressed against the latter.

Heretofore, it has been the regular practice to cut away the surplus material of molded cup handle parts by a manual trimming, or whittling, operation. The manual trimming and shaping of handle parts, with the speed practically necessary in the commercial production of tableware, requires the services of skilled workers, and even when the worker is highly skilled, his output is customarily reduced by wastage due to the imperfect trimming or shaping of an appreciable percentage of handle parts worked upon.

The handle surface shaped by the trimming operation must conform in contour to the portion of the external cup surface which it is to engage. While tea and coffee cups vary widely in their external surface shape, some, at least, of the external cup surface engaged by the handle part ordinarily curves in two directions, namely, it curves about the cup axis, and it curves about an axis of curvature transverse to the cup axis. In preferred forms of our mechanism, the corresponding curvature of the handle surface about different axes is effected by a cutter or cutters each mounted to turn about an axis, and each having a cutting edge elongated in the direction of said axis and displaced from said axis by different distances at different points along its length. In a form of our invention adapted for use in forming a handle for attachment to a cup body comprising both globular and cylindrical outer surface portions, the oscillatory movement of a cutter about an axis, is supplemented by a bodily movement of the cutter and its axis relative to the work holder.

A special and practical important object of the invention is to so cut away the surface material of the handle as to leave a surface which is not only properly shaped but is properly smooth and continuous, and to this end we have devised handle shaping mechanism including simple and effective means for cutting away the bulk of the surplus material of each handle part by a roughing cut, and cutting away the remainder of the surplus material followed by a finishing cut, since the latter need remove only a thin slice of material, it leaves the trimmed surface of the handle part suitably smooth and free from fissures or cracks extending into the handle from said surface.

In some of its preferred forms, our handle forming mechanism includes simple and effective means for automatically adjusting the mechanism to give a single cutting blade finishing and cutting strokes in regular alternation, and without requiring the operator to give attention to the adjustment. In a somewhat simpler form of the invention, the roughing and finishing cuts are effected by separate, roughing and finishing cutter blades successively engaging the work. The power required for the operation of handle forming mechanism constructed in accordance with the present invention is so small as to make it practically convenient and desirable to operate the mechanism manually instead of by power means.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described our preferred embodiment of the invention.

Of the drawings:

Fig. 1 is a side elevation, partly broken away and in section, of a cup handle forming machine comprising one embodiment of our invention;

Fig. 2 is a plan view on a larger scale than Fig. 1, of a portion of the machine therein shown, with parts broken away and in section;

Fig. 3 is a partial section on the line 3—3 of Fig. 2;

Fig. 4 is a somewhat diagrammatic representation of a modified form of cup handle forming machine;

Fig. 8 is a somewhat diagrammatic plan view of a fourth form of the handle forming mechanism;

Fig. 9 is a side elevation of a portion of the mechanism shown in Fig. 8;

Fig. 10 is an end elevation of a part shown in Fig. 9;

Fig. 11 is a somewhat diagrammatic plan view of another form of handle forming mechanism; and Fig. 12 is a side elevation of a portion of the mechanism shown in Fig. 11.

Figure 5:
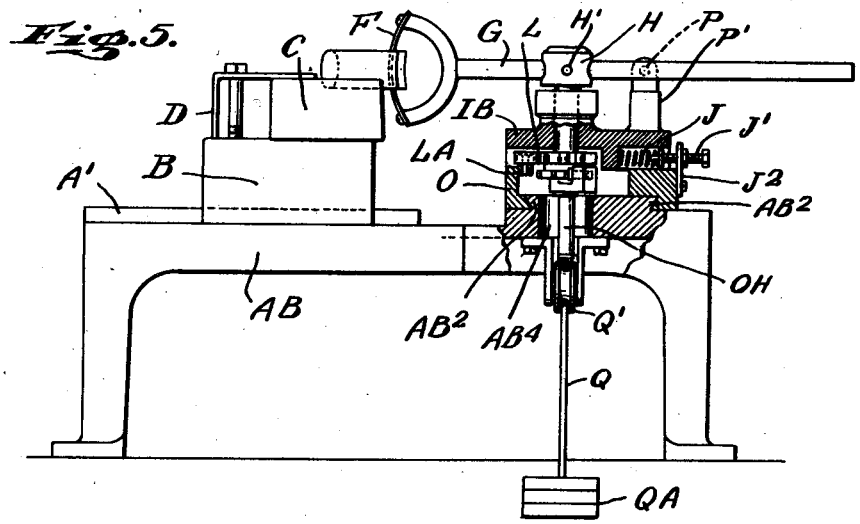
Fig. 5 is a view taken similarly to Fig. 1 of a third handle forming machine.

The machine shown in Figs. 1, 2 and 3 comprises a frame or element A having legs and a table-like top portion shown as formed at its upper side with horizontally extending guide ribs A' and A². Mounted on the frame A is a work supporting member B, which, advantageously, is adjustable along the guide ribs A', but normally is rigidly secured to the element A, as by means of a clamping screw B'. A work holder C, varying in form with the shape of the ceramic part worked upon, is removably secured to the member B as by clamping means D. As shown, the work holder C is formed with a curved groove C' in its top surface, the groove being open at its ends at one side of the work holder and extending arc-like about an uprising or lug portion C² of the work holder. As shown in the drawings, the ceramic handle part E mounted in the work holder is of irregular ring form and extends around the work holder portion C², with one portion received in the groove C' and another portion extending away from the side of the work holder at which the ends of the groove C' open.

The machine shown in Figs. 1, 2 and 3 comprises a single cutter F, having a curved, vertically elongated, cutting edge F', and having its upper and lower ends connected to upper and lower curved arms G' and G² secured to one end of a horizontally disposed cutter bar G mounted to oscillate about a vertical axis which is horizontally displaced from the cutting edge and from the work holder. As shown, the cutter bar G extends through and is secured, as by means of a set screw H', in a cutter bar support H. The latter comprises a downwardly extending shaft portion H², which is journalled for rotative movement in a tool carriage I. The latter is mounted on and movable longitudinally of the guides A² of the support A, toward and away from the work holder C. As shown in Fig. 3, the table portion of the frame A is formed with an opening A³ through which the shaft H² extends, and which is suitably elongated in the direction of the guide ribs A² to accommodate the automatic tool carriage adjustments hereinafter described.

The tool carriage I is shown as biased for movement along the guides A² toward the work holder C, by a bias spring J acting between the carriage and a normally stationary but preferably adjustable abutment member J'. As shown, the spring J is received within a socket formed for the purpose in the carriage I, and the abutment member J' is in the form of a bolt or threaded rod extending through a threaded opening in a bracket J² carried by the frame A. The bias tension of the spring J may thus be adjusted by rotating the screw J'.

The bias spring J cooperates with other means to automatically adjust the tool carriage back and forth between its roughing and finishing cut positions. Said other means include a notched wheel K journalled on the shaft H², and at the underside of the table or top portion of the frame A, and a stop member L, shown as a roller journalled on a shaft L' fastened in the frame A. In the roughing cut position of the tool carriage I, the stop L is received in one or another of a plurality of notches K' at the periphery of the wheel K. The notches K' are all of the same depth and alternate with notches K², which are similar to one another and are deeper than the notches K'. When the angular position of the wheel K is such that the stop L is received in one of the notches K', the cutting edge F' is adapted to move along the arc E' of Fig. 2, and effect a roughing cut, and when the stop L is received in one of the notches K², the cutting edge F' is adapted to move along the arc E² and effect a finishing cut which removes a slice of material equal in thickness to the distance between the arcs E' and E².

In the arrangement shown, the notched wheel K is given a partial rotation on each back stroke of the cutter bar G from its dotted line position shown in Fig. 2, so that at the end of the back stroke, the stop L will be received in a notch K' or K², accordingly as it was received in the notch K² or K' at the beginning of the stroke. The wheel K is thus intermittently rotated by a pawl and ratchet mechanism comprising a ratchet wheel M mounted on the shaft H² and rigidly connected to the wheel K, a ratchet pawl N and a ratchet lever arm N' secured to the shaft H² and formed with a guide way for the pawl N, in which the latter is movable in a direction generally radial to the shaft H², the pawl being spring pressed into operative position with the ratchet wheel. As shown, the wheel K is formed with three notches K², and the ratchet wheel M has six ratchet teeth M'.

In the contemplated operation of the apparatus shown in Fig. 1, each handle part E to be operated on, is manually placed in the work holder C, and may be loosely held in the work holder by one hand of the operator, while the latter, with his other hand, gives the cutter bar G two complete oscillatory movements, so as to effect first a roughing cut and then a finishing cut. On each movement of the cutter bar from its full line into its dotted line position shown in Fig. 2, the pawl N rides up the inclined back side of a corresponding ratchet tooth M' and then snaps in alongside the radial shoulder of the tooth. On the return movement of the cutter bar, the ratchet wheel M is advanced a sixth of a turn, and the wheel K is given a similar turning movement. On each such turning movement of the wheel K, a tooth of the latter interposed between two adjacent notches K' and K² acts against the roller stop L in such manner as to first force the tool carriage I to the right as seen in Figs. 1 and 2 against the tension of the spring J until the crown of the tooth passes from one side to the other of the plane including the axis of the shaft H² and roller stop L. As the remainder of the movement of said tooth is effected, the table I is returned to the left by the spring J.

In extensive use, the mechanism shown in Figs. 1, 2 and 3 has been found to be simple, effective and well adapted for its intended purposes. The power required to oscillate the cutter arm G is slight, and the mechanism can be readily adjusted and adapted for operation on handle parts of different shapes and dimensions, and requiring the cutter to be located at different distances from the axis of its support H. The finished surface of the handle E formed with the arrangement shown in Figs. 1 to 3 is spherical, the radius of curvature of the cutting blade F being substantially equal to the radius of curvature of the arcs E' and $E^2$ of Fig. 2.

The general principles of our invention may be employed in handle shaping machines differing in numerous respects from that shown in Figs. 1, 2 and 3. For example, as shown in Fig. 4, the work holder CA may be turned at right angles, so that its handle receiving groove C' is formed in a side of the work holder parallel to the axis of oscillation of the cutter bar support H. With this arrangement, the blade FA may have its elongated cutting edge given any shape needed to permit the handle to fit against a cup body having its outer surface in the form of a surface of revolution.

Except in respect to the disposition of the work holder CA, the shape of the blade FA and in consequence the shape of the cutter bar arms $G^3$ and $G^4$ to which the ends of the blade are connected, the apparatus shown in Fig. 4 may be identical with that shown in Figs. 1, 2 and 3. In respect to the manner in which the finished handle surface is given its curvatures in two directions, the mechanism of Fig. 4 involves a mechanical inversion of the mechanism of Figs. 1–3. Thus the curvature about the axis parallel to the cup body axis which is effected in Figs. 1 to 3, by the movement of the cutter about the axis of the shaft $H^2$, is due in Fig. 4 to the curvature of the blade FA, while the curvature about the axis of curvature perpendicular to the cup body axis due in Figs. 1 to 3 to the curvature of the blade F'', results in Fig. 4 from the movement of the blade FA about the axis of the support H.

Figure 6:
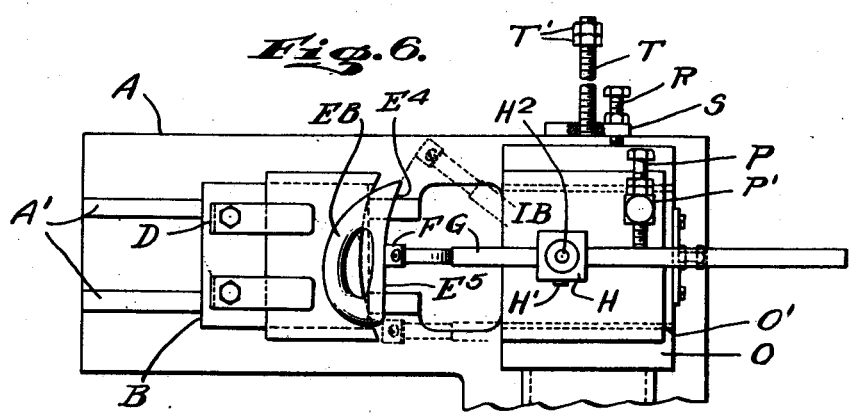
Fig. 6 is a plan view of a portion of the machine shown in Fig. 5.
Figure 7:
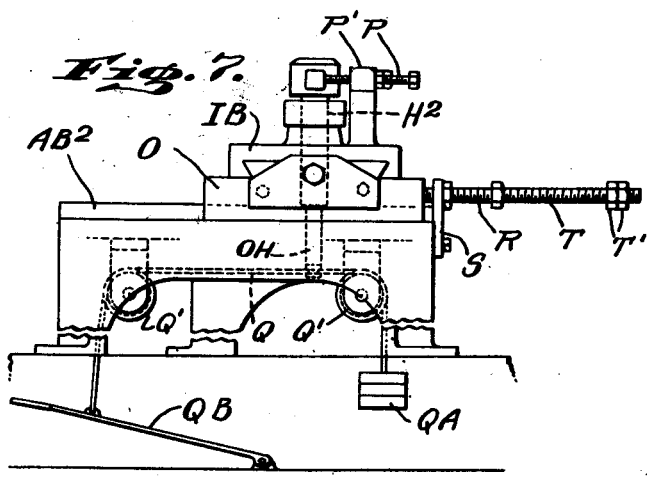
Fig. 7 is an end elevation of the machine shown in Figs. 5 and 6.

The handle trimming machine shown in Figs. 5, 6 and 7 comprises a support frame AB differing from the supporting frame A of Figs. 1–3 in that in lieu of guides $A^2$ parallel to the guides A', it is provided with horizontal guides $AB^2$ extending transversely to the guides A'. Mounted on the support AB for engagement with and movement along the guides $AB^2$, is a carriage or table O provided with guides O' parallel to the guides A', and on which a tool carriage IB is mounted and moved just as the tool carriage I of Figs. 1 to 3 is mounted and moved on the supporting frame guides $A^2$.

So long as the table member O of Figs. 5, 6 and 7 remains stationary, relative to the frame support AB, there is no operative difference between the machine shown in Figs. 5, 6 and 7 and that shown in Figs. 1 to 3. A handle similar in form to the handle E, may be so disposed as to have its trimming operation completed as the cutter bar G moves angularly in the counterclockwise direction from its initial upper dotted position shown in Fig. 6, and in such case, there need be no operating difference between the machine shown in Figs. 5 to 7 and that shown in Figs. 1 to 3. In the operation for which the machine actually shown in Figs. 5 to 7 was especially devised, however, each trimming cut on the handle EB involves a first stage operation in which the cutter bar is moved counterclockwise from its initial position into its position shown in full lines in Fig. 6, and a second stage operation in which the table O and all parts supported by it are moved bodily in the direction longitudinally of the guides $AB^2$ so that the cutter F is moved from its full line position to its lower dotted line position shown in Fig. 6, and so that the lower portion of the trimmed surface is curved in one direction only, namely, about the horizontal axis of curvature of the cutting blade F. The handle EB shaped as described, is adapted for attachment to a cup body of the type comprising an upper cylindrical portion and a lower globular or spherical portion. As will be understood, the portion of the handle EB which is lowermost in Fig. 6, is the upper portion of the handle when incorporated in a cup having its open end uppermost.

All movements of the cutter F of Figs. 5 to 7 may be effected manually by an operator who first turns the cutter bar about the axis of its support H to bring the parts into the full line position shown in Fig. 6, in which the cutter bar engages an adjustable stop screw P threaded through a post P' removably mounted on the carriage IB and limiting the counterclockwise turning movement of the cutter bar, after which, the operator while holding the cutter bar against back turning movement about the axis of the support H, applies force to the cutter bar causing the tool carriage IB and the table O to move bodily downward as seen in Fig. 6, and to the left as seen in Fig. 7.

In some cases, it is convenient as shown to provide special means for giving the carriage O its movements. To this end, in the construction shown in Figs. 5–7, the shaft $H^2$ which is journalled in the carriage O, has a lower end extension OH extending down through an opening $AB^4$ in the table portion of the frame support AB, and having its lower end connected to a treadle operated flexible element Q running over pulleys Q' so disposed that the portion of the element Q extending between the pulleys is parallel to the guides $AB^2$. To the depending right hand end of the element Q, as seen in Fig. 7, is attached a carriage return or biasing device in the form of a counterweight QA. The latter tends to move the carriage O into, and to hold it in its right hand position, as seen in Fig. 7 in which it engages an adjustable stop in the form of a bolt R threaded through a bracket extension S of the frame support. As shown in Fig. 7, the other depending end of the element Q is connected to a treadle QB, which may be depressed by the foot of the operator to move the cutter bar from its condition shown in full lines in Fig. 6, into its position shown in dotted lines in that position.

A bolt T parallel to the guides $AB^2$, which is connected at one end to the carriage O, is provided adjacent its other end with lock nuts T'. The latter form an abutment adapted to engage the bracket S and thereby limit the movement of the carriage O to the left, as seen in Fig. 6. The machine arrangement shown in Figs. 5, 6 and 7, includes means for automatically adjusting the tool carriage IB back and forth along the guides O', between its roughing and finishing cut positions relative to the carriage O, which may be identical with that shown in Figs. 1, 2 and 3, except that in Figs. 5–7, the supporting shaft LA for the stop roll L, and the bracket part $J^2$, are each secured to the carriage O, instead of to the stationary frame support. By suitable adjustment of the stops P, R, and T and, if necessary, the removal of the stop P, the apparatus may be rendered operative to shape handles of many different forms.

In the form of our invention shown in Figs. 8–10, the cutter FD is carried by a cutter blade holder GD which is movable toward and away from, as well as angularly about the axis of a cutter bar support HC. The support HC is pivotally mounted on a tool carriage IC, which need not differ from the carriage I of the machine shown in Figs. 1–3, either in respect to its general construction or in respect to the means by which it is adjusted between roughing and finishing cut positions. The cutter holder GD is a vertically disposed member provided at its upper and lower ends with aligned trunnion pivots GD' and $GD^2$ respectively, and the portion of the common axis of the pivots at the work level is preferably in close proximity, to the active portion of the cutting edge of the blade FD. The trunnion pivots GD' and $GD^2$ are journalled in the ends of a yoke shaped member GC', which has a stem extension GC'' telescopically received in an axial passage $GC^3$ in a cutter bar GC. The latter is rigidly, though preferably adjustably, secured to the support HC. The bar GC and stem GC'' are relatively formed, or provided, as shown, with a splined connection, to prevent their relative rotation.

In the form shown in Figs. 8–10, the cutter FD is given its movements toward and away from the axis of the support HC by means of a cam follower extension $GD^3$ of the lower pivot $GD^2$ which travels in a cam slot U' formed in a cam member U. The latter is rigidly, though preferably adjustably, connected to the support IC, by means including an arm IC'. Advantageously, the cam follower $GD^3$ is sufficiently elongated, and the cam slot or groove U' so shaped, that throughout each cutting stroke, the cutter FD will be maintained in a suitable, approximately tangential, relation to the adjacent surface of the work. With the mechanism shown in Figs. 8–10, the contour of the handle surface formed by the cutter, can be given a wide variety of forms.

In all of the forms of our invention hereinbefore referred to in detail, the roughing and finishing cuts are given each handle by the same cutter, or cutting blade. In some cases, however, we may employ separate roughing and finishing cutting blades. One arrangement of this kind, including a roughing cutter GE and a finishing cutter GF is shown in Figs. 11 and 12. In those figures, the roughing cutter FE is carried by a cutter bar GE mounted to turn about a vertical axis relative to a tool support IE, which may be an integral portion of the machine frame A and in any event is normally stationary relative thereto. As shown, the cutter bar GE is formed, for adjustment purposes with an elongated slot GE' receiving a flattened portion of a bushing or hub member $GE^2$, which is journalled on a vertical shaft $H^5$ carried by the tool support IE. As shown, the cutter bar GE is rigidly but adjustably clamped to the hub part $GE^2$ by clamping screws $GE^3$ connecting the opposite side walls of the slot GE' at opposite sides of the bushing $GE^2$.

The finishing cutter FF is supported and mounted exactly as is the blade FE by means including parts GF, GF', $GF^2$, $GF^3$, corresponding respectively, to the parts GE, GE', $GE^2$ and $GE^3$. As shown, the bushing or hub part $GF^2$ bears on the top of the part $GE^2$ and each of those parts are held against movement axially of the shaft $H^5$ away from the bearing surface of the support IE on which the part $GE^2$ bears, by a collar $H^{10}$ secured to the upper end of the shaft $H^5$ above the part $GF^2$.

In some cases, it may be desirable to permit of independent angular movements of the cutter blades GE and GF about the axis of the shaft $H^5$. Ordinarily, however, the two cutter blades normally are rigidly connected, though angularly displaced from one another as shown in Fig. 11, so as to permit of the successive engagement of a preformed handle part first by the cutter FE and then by the cutter FF on a single angular adjustment or cutting stroke or the two rigidly connected blades. As shown, the hub parts $G^2$ and $GF^2$ are rigidly connected by a removable bolt or pin $GF^{10}$.

As has been demonstrated in practice, the use of the invention results in a substantial reduction in the cost of preparing handles for attachment to cups as previously described. The uniform accuracy with which the handle surfaces to be pressed into adhering engagement with the cup bodies are formed, insures better adherence of the handles to the cups preparatory to and during the drying and firing operations to which the cups with their attached handles are subjected, as well as in the finished ware. As will be apparent, many changes may be made in the hereinbefore described details of machine construction and arrangement referred to. While not essential, we note that the cutter blades may advantageously be in the form of thin steel blades, and the curvature of each blade may be varied to a significant extent by adjustment of the means by which its ends are secured to the corresponding cutter bar.

Having now described our invention, what we claim as new and desire to secure by Letters Patent, is:

1. In a machine for trimming preformed handle parts of ceramic material in a plastic condition, the combination with a normally stationary work holder, of cutter supporting means mounted to turn about an axis and a cutter supported by said means and having a cutting edge elongated in the direction of said axis and varying in its distance from said axis at different points along its length and means for moving said cutter toward and away from said axis as said supporting means turns about said axis.

2. In a machine for trimming preformed parts of ceramic material in a plastic condition, the combination with a normally stationary work holder, of cutter supporting means mounted for turning movement about an axis and a cutter supported by said means and moved along an arc by said movement and having a cutting edge elongated in the direction of said axis and varying in its distance from said axis at different points along its length, and means for adjusting said supporting means to move said axis in the general direction of the tangent to one end portion of said arc, whereby in effecting a cut the cutter may be moved along a path including a curved portion and a straight portion.

3. In a machine for shaping parts of ceramic material in a plastic condition, the combination with a supporting frame, of a work holder secured to said frame, a tool carriage mounted on said frame for movement toward and away from said work holder, a cutter pivotally mounted on said carriage for cutting stroke movements in one direction and for return stroke movements in the opposite direction, and means actuated on the said movements of the cutter for adjusting the carriage alternately away from and toward the work holder so that the cutting strokes effected are alternately roughing and finishing cuts.

4. A machine as specified in claim 3 in which the roughing and finishing cutters are rigidly connected and are mounted to turn about an axis in fixed position relative to said work holder.

5. A machine for trimming a pre-formed handle part of ceramic material in plastic condition, comprising in combination a cutter having an elongated cutting edge, means for moving said cutter along a pre-determined path transverse to the length of said cutter, said means including cutter supporting means mounted to turn about an axis at one side of said path, and said cutting edge being elongated in the direction of said axis, and a normally stationary work holder adapted to support said handle part in position for continuous engagement of the latter by said cutting edge while said cutter is moving through an elongated portion of its cutting path.

6. A machine for trimming a pre-formed handle part of ceramic material in plastic condition, comprising in combination, cutter operating means adapted to move a cutter along a crooked roughing cut path of predetermined form and to thereafter move a cutter along a finishing cut path substantially similar in form to and adjacent but laterally displaced a predetermined distance from the first mentioned path, and a normally stationary work holder adapted to support said handle part in position for a continuous engagement of the latter by the cutter moving along each path during its movement through an elongated portion thereof.

7. A machine as specified in claim 5, including means for adjusting said cutting edge back and forth between two different pre-determined positions at different distances from said axis.

8. A machine for trimming a pre-formed handle part of ceramic material in plastic condition, comprising in combination a roughing cutter, a finishing cutter, common cutter operating means adapted to successively move the roughing cutter along an elongated crooked cutting path of predetermined form and to thereafter move said finishing cutter along a second elongated cutting path substantially similar in form to and alongside but displaced by a slight predetermined distance from the first mentioned path, and a normally stationary work holder adapted to support said handle part in position for a continuous engagement of the latter by each cutter while the latter is moving through its said cutting path.

WALTER F. ZALEWSKI.
W. E. WOODCOCK.